UNITED STATES PATENT OFFICE.

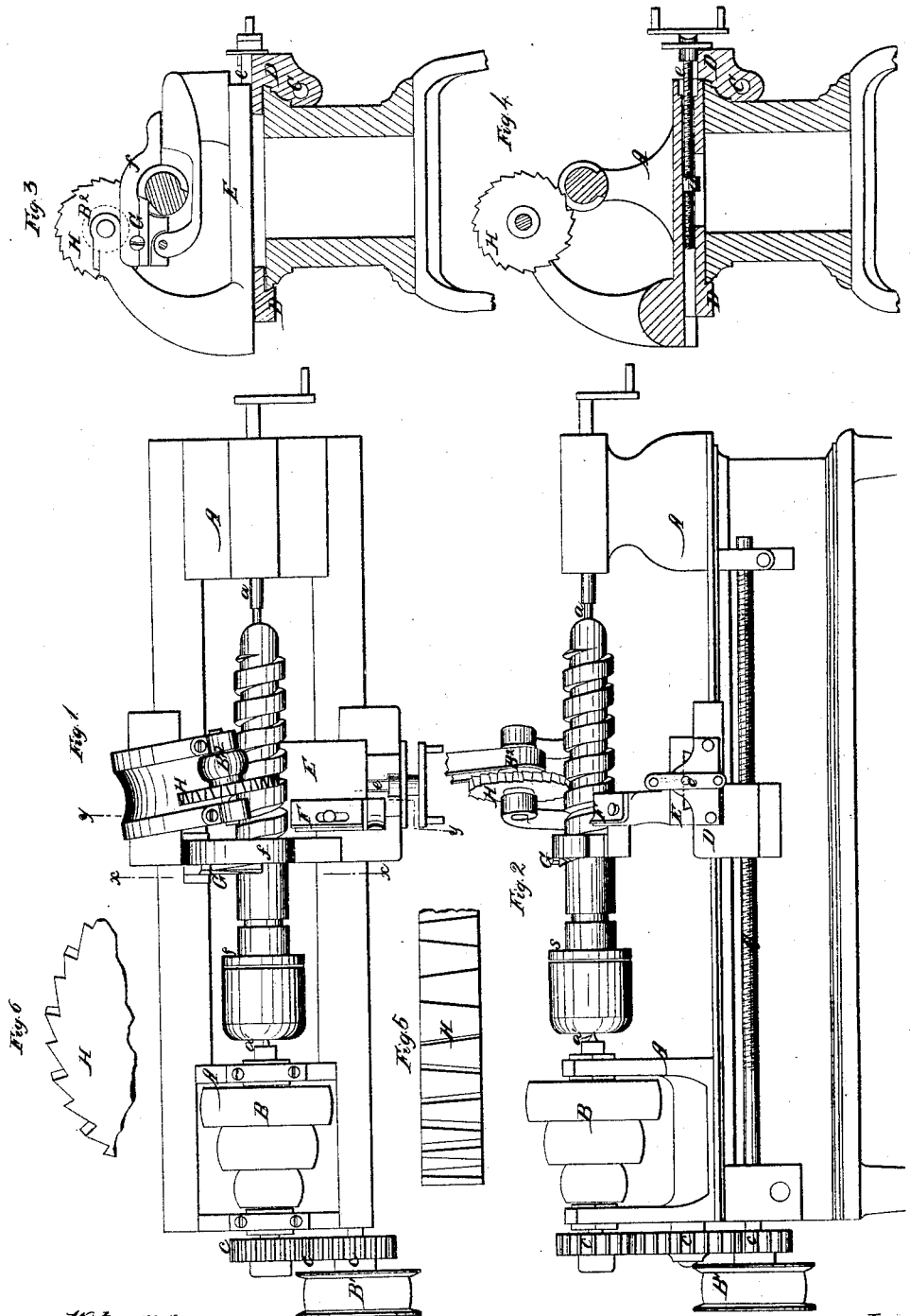

JOSEPH A. MONTGOMERY, OF COLUMBUS, OHIO.

IMPROVED MACHINE FOR CUTTING SQUARE THREADS OF WOOD-SCREWS.

Specification forming part of Letters Patent No. 37,821, dated March 3, 1863.

*To all whom it may concern:*

Be it known that I, JOSEPH A. MONTGOMERY, of Columbus, in the county of Franklin and State of Ohio, have invented a new and useful machine for cutting bench and other similarly-threaded wood-screws; and I do hereby declare that the following is a full, clear, and exact description of the same, reference being had to the accompanying drawings, forming part of this specification, in which—

Figure 1 is a plan of a lathe with my invention applied to it. The V-tool and the rotary-disk tool are both shown in action on the one blank, but in practice only one tool is used at the same time and on the same blank. Fig. 2 is a side elevation of the same. Fig. 3 is a cross section in the line $xx$, and Fig. 4 a cross-section in the line $yy$ of the same. Figs. 5 and 6 are enlarged views of the rotary cutter.

Similar letters of reference in the several figures indicate corresponding parts.

My invention consists, first, in cutting screw-threads with perpendicular or square edges on wooden blanks by means of a rotary tool.

It consists, second, in adapting the one lathe-rest to the purposes of cutting square and V threaded screws by combining a hinged V or other similar tool with the rotary tool.

It consists, third, in the peculiar construction of the periphery of the rotary tool.

It consists, fourth, in the combination of the rotary tool, hinged V tool, and the turning-off bit or tool with the one slide-rest, substantially as hereinafter described.

It consists, fifth, in the combination of the two driving-belt drums with the organization for turning down the bench-screw blank, cutting a V-thread on screws, or cutting the square or perpendicular edged screw-threads and moving the slide-rest longitudinally.

To enable others skilled in the art to make and use my invention, I will proceed to describe the same with reference to the drawings.

A A are the center stands, between which the screw-blank of wood is centered on points $a\ a'$, as in an ordinary lathe. B is a cone pulley or drum made fast on the head center $a'$ and revolving with the same. C is a feed-screw arranged on the side of the lathe-frame and working in a nut of the slide-rest D, as shown. This screw is connected to the center $a'$ by means of gear-wheels $c\ c\ c$. It also has a belt drum, B', on its head end. If the center $a'$ is driven from pulley B', its speed will be very fast, but if it is driven from pulley B' its speed will be very slow, comparatively.

On the longitudinally-moving slide-rest D a tool-stock, E, is fitted, so as to move transversely. The fitting is effected by means of a dovetail, and the adjustment is produced by means of a nut and screw, $d\ e$, as represented.

In the drawings I have shown a turning-off tool, F, and adjustable or hinged V-shaped tool G for cutting V-screw threads, and a rotary tool, H, for cutting the square-edged screw-threads. The tool F is mounted on the stock E, so as to come nearly on a line with the horizontal axis of the points $a\ a'$. Its location is on the right side of the lathe. The tools G and H are located on the left side of the lathe, and are mounted on the stock E, as represented. It will be observed that the tool G is adjustable on a hinge-arm, $f$, of the stock E, and therefore can be thrown out of action or into action independent of the adjustment made by the screw and nut $d\ e$, or other tools of different sizes hinged in its place.

The tool H, which is driven by a belt, B², consists of a disk or wheel with short sections of spiral cutters around its circumference, the spiral run of one cutter being such with respect to the spiral run of a succeeding cutter throughout the whole series of cutters that a continuation of the same around a cylinder would present intersecting spirals; or, in other words, every pair of cutters present two angles with respect to the axis of the rotary disk, which are converse to one another. Thus a double cutting-edge to each cutter is produced—to wit, a side and face edge, and the reverse run of the face-edge of one cutter to that of a succeeding cutter is such that the side cutting-edges of one half of the whole series of cutters come upon one face of the rotary tool, while the side cutting-edges of the other half of the series of cutters come upon the opposite face of the disk. It is by this arrangement that both sides of the channel between the thread of the screw are cut perpendicular to the base of the same with perfection, the spiral run or angular position of the cutters enabling them to operate with a gradual draw-cut both on the bottom and at the sides of the channel between the thread.

It will be observed that the shaft of the rotary cutter is set oblique to the axes of the points $a\ a'$. This is in order to have the rotary tool conform to the desired pitch of the screw-thread being cut.

In the drawings I have shown the V-tool supported in a curved bracket extending laterally and upward from the right side of the stock E, and also have shown the rotary tool hung in curved brackets extending up from the left side of the stock, so that it slightly overhangs the screw-blank which is to be screw-threaded. The arrangement of all the tools on one stock is such that when the turning-down tool F is in action the V-tool G and the rotary tool H are out of acting position, and vice versa. I, however, do not confine myself to this special construction and arrangement of the stock so far as the rotary tool alone is concerned, as I believe myself to be the inventor of the principle involved in a rotary-tool adapted and applied to the cutting of a square thread on wooden screw-blanks and the combination of the same with other tools.

It is obvious that a rotary tool such as described will cut the square screw-thread without aid from the V-cutter, and therefore it should be understood that the V-cutter is only brought into use when the screw to be cut on the lathe is a V-thread screw. The V-tool, being hinged, can be thrown out of the way when not in use or removed entirely. It is also obvious that the bench-screw blanks may be finished with a shoulder, $s$, previously to centering in the lathe, and in that case the turning-down tool might be dispensed with. It, however, is preferable to arrange all the tools on one slide-rest and do the different parts and kinds of the work on the one lathe.

As the rotary tool is used independent of the V-tool, it may be made to cut a screw-thread both in the forward and back motions of the slide-rest.

The manner in which the screw-blank is centered in the lathe and that the tools operate upon it, is illustrated in the drawings very plainly; and it remains only to be stated that the screw-blank to be threaded is revolved from twenty-five to fifty revolutions per minute, while the periphery of the rotary tool is made to revolve through a space of from six thousand to ten thousand feet per minute. The motions having these relations, and the cutters on the tool formed as described, the thread is formed perfectly and without danger of breaking the wood on the corners of the thread, the sides and bottom of the cut being smooth and true, the perfection of the working of the machine being such that the screw being threaded can be revolved with or against the cutter at option, thus enabling the operator to thread a screw with both motions of the slide carrying the tool, and save the motion lost in "running back" in ordinary lathes.

The lathe-screw and cutter-wheel are driven by three separate belts placed on three separate overhead counter-shafts.

The wood-screws which I make are a new manufacture, and made only by the Ohio Tool Company, at Columbus, and the application of a rotary tool to displace the wood between the thread of such screws was never made until my invention was developed.

What I claim, and desire to secure by Letters Patent, is—

1. Cutting screw-threads with vertical or square edges on wooden blanks by means of a rotary tool.

2. The combination of a rotary and hinged tool on the one stock or slide-rest, substantially as described, and for the purpose set forth.

3. The construction of the periphery of the rotary tool substantially as described.

4. The combination of the rotary tool, hinged adjustable V-shaped tool, and the turning-off bit or tool with the slide-rest substantially as described.

5. Setting the shaft of the rotary tool oblique with respect to the centers of the lathe substantially as set forth.

6. The combination of the two driving-belt pulleys or drums with the tools for turning off the bench-screw blank, cutting V-threads on the same, or for cutting the square or perpendicular edged screw threads, substantially as and for the purpose set forth.

JOSEPH A. MONTGOMERY.

Witnesses:
FREDK. J. FAY,
A. B. ROBINSON.